United States Patent
Wang (10) Patent No.: US 11,432,136 B2
(45) Date of Patent: Aug. 30, 2022

(54) METHOD AND DEVICE FOR DETERMINING CAPABILITY OF A TERMINAL, AND COMPUTER-READABLE STORAGE MEDIUM

(71) Applicant: GUANGDONG OPPO MOBILE TELECOMMUNICATIONS CORP., LTD., Guangdong (CN)

(72) Inventor: Shukun Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/337,088

(22) Filed: Jun. 2, 2021

(65) Prior Publication Data

US 2021/0345095 A1    Nov. 4, 2021

Related U.S. Application Data

(63) Continuation of application No. PCT/CN2019/086451, filed on May 10, 2019.

(51) Int. Cl.
*H04W 8/24* (2009.01)
*H04W 24/10* (2009.01)
*H04W 72/04* (2009.01)

(52) U.S. Cl.
CPC ............. *H04W 8/24* (2013.01); *H04W 24/10* (2013.01); *H04W 72/048* (2013.01); *H04W 72/0453* (2013.01)

(58) Field of Classification Search
CPC .. H04B 7/0417; H04B 7/0626; H04B 7/0628; H04B 7/024; H04B 7/0413; H04B 7/0456; H04B 7/0486; H04B 7/063; H04B 7/0632; H04B 7/0639; H04W 24/10; H04W 8/24; H04W 72/048; H04W 24/00; H04W 24/02; H04W 28/18; H04W 36/00;
(Continued)

(56) References Cited

U.S. PATENT DOCUMENTS 10,187,168 B2     1/2019   Hwang et al.
11,133,910 B2 *   9/2021   Huang ............... H04W 24/10
(Continued)

FOREIGN PATENT DOCUMENTS

CN    104735785 A    6/2015
CN    109716807 A    5/2019
(Continued)

OTHER PUBLICATIONS

International Search Report in the international application No. PCT/CN2019/086451, dated Jan. 21, 2020.
(Continued)

*Primary Examiner* — Brian T O'Connor
(74) *Attorney, Agent, or Firm* — Perkins Coie LLP (57) ABSTRACT

A method and device for determining capability of a terminal, and a computer-readable storage medium are provided. The method includes that: a terminal sends at least one piece of capability indication information to a network, the at least one piece of capability indication information indicating whether the terminal supports measurement for at least one of a first frequency layer or a second frequency layer and reporting of a measurement result.

14 Claims, 3 Drawing Sheets

(58) Field of Classification Search
CPC ......... H04W 36/0055; H04W 36/0085; H04W 36/0088; H04W 48/18; H04W 72/04; H04W 72/0413; H04W 72/042; H04W 72/0446; H04W 72/0453; H04W 80/08; H04L 5/001; H04L 5/0023; H04L 27/0006; H04L 5/00; H04L 5/0048; H04L 5/0051; H04L 5/0057; H04L 5/0092; H04L 5/0094

See application file for complete search history.

(56) References Cited

U.S. PATENT DOCUMENTS

| | | | |
|---|---|---|---|
| 2012/0178465 A1 | 7/2012 | Lin et al. | |
| 2017/0317775 A1 | 11/2017 | Hwang et al. | |
| 2017/0367073 A1* | 12/2017 | Murugan | H04B 1/0053 |
| 2018/0076872 A1* | 3/2018 | Li | H04L 5/0094 |
| 2018/0092085 A1* | 3/2018 | Shaheen | H04W 36/14 |
| 2018/0206113 A1* | 7/2018 | He | H04W 8/24 |
| 2020/0014523 A1* | 1/2020 | Huang | H04L 5/0053 |
| 2020/0128421 A1* | 4/2020 | Yang | H04W 24/10 |
| 2020/0260310 A1* | 8/2020 | Kim | H04W 80/02 |
| 2020/0267791 A1 | 8/2020 | Yilmaz et al. | |
| 2020/0313731 A1* | 10/2020 | Pals | H04B 7/0413 |
| 2021/0195458 A1 | 6/2021 | Priyanto et al. | |
| 2021/0219154 A1* | 7/2021 | Han | H04W 76/27 |
| 2021/0227610 A1* | 7/2021 | Cui | H04W 76/15 |
| 2021/0315026 A1* | 10/2021 | Jung | H04W 74/0816 |

FOREIGN PATENT DOCUMENTS

| | | | | |
|---|---|---|---|---|
| WO | 2018083230 A1 | 5/2018 | | |
| WO | 2020167182 A1 | 8/2020 | | |
| WO | 2020167205 A1 | 8/2020 | | |
| WO | 2020190197 A1 | 9/2020 | | |
| WO | WO-2020222199 A1 * | 11/2020 | ............ | H04W 76/27 |
| WO | 2021037921 A1 | 3/2021 | | |

OTHER PUBLICATIONS

3GPP TS 36.306 V16.2.0 (Sep. 2020), 3rd Generation Partnership Project; Technical Specification Group Radio Access Network; Evolved Universal Terrestrial Radio Access (E-UTRA); User Equipment (UE) radio access capabilities (Release 16).

3GPP TS 38.331 V16.2.0 (Sep. 2020), 3rd Generation Partnership Project; Technical Specification Group Radio Access Network; NR; Radio Resource Control (RRC) protocol specification (Release 16).

3GPP TS 36.331 V16.2.1 (Sep. 2020), 3rd Generation Partnership Project; Technical Specification Group Radio Access Network; Evolved Universal Terrestrial Radio Access (E-UTRA); Radio Resource Control (RRC); Protocol specification (Release 16).

3GPP TS 38.306 V16.2.0 (Sep. 2020), 3rd Generation Partnership Project; Technical Specification Group Radio Access Network; NR; User Equipment (UE) radio access capabilities (Release 16).

3GPP TS 36.331 V15.5.1,"3rd Generation Partnership Project; Technical Specification Group Radio Access Network; Evolved Universal Terrestrial Radio Access (E-UTRA); Radio Resource Control (RRC); Protocol specification (Release 15)", Apr. 2019. 944 pages.

3GPP TS 38.331 V15.5.1, "3rd Generation Partnership Project; Technical Specification Group Radio Access Network; NR; Radio Resource Control (RRC) protocol specification (Release 15)", Apr. 2019. 489 pages.

Ericsson, "Capabilities for idle/inactive measurements", 3GPP TSG-RAN WG2#106 R2-1907249, Reno, USA, May 13-17, 2019. 2 pages.

Huawei, HiSilicon, "Early measurement configuration/reporting in LTE and NR RRC_IDLE", 3GPP TSG-RAN WG2 Meeting#105 R2-1901612, Athens, Greece, Feb. 25-Mar. 1, 2019. 3 pages.

Huawei, HiSilicon, "UE capabilities for DC and CA enhancements", 3GPP TSG-RAN WG2 Meeting#107bis R2-1913616, Chongqing, China, Oct. 14-18, 2019. 9 pages.

Oppo, "Open issues for early measurement", 3GPP TSG-RAN WG2 Meeting #108 R2-1914553, Reno, USA, Nov. 18-22, 2019. 7 pages.

Supplementary European Search Report in the European application No. 19928487.8, dated Nov. 18, 2021. 13 pages.

Office Action of the Indian application No. 202127018428, dated Feb. 10, 2022. 7 pages with English translation.

Ericsson (Rapporteur), "Email discussion [105#53] [LTE_NR_DC_CA_enh-Core] Early measurements Signaling", 3GPP TSG-RAN WG2 Meeting #105bis R2-1904553, Xi'an, P.R. China, Apr. 8-12, 2019. 35 pages.

Qualcomm Incorporated, "Supporting early measurement reporting in NR", 3GPP TSG RAN WG2 Meeting #105 R2-1900104, Athens, Greece, Feb. 25-Mar. 1, 2019. 6 pages.

Catt, "Further Considerations on Eady Measurement Reporting", 3GPP TSG-RAN WG2 Meeting #105bis R2-1903314, Xi'an, China, Apr. 8-12, 2019. 4 pages.

First Office Action of the European application No. 19928487.8, dated May 9, 2022. 6 pages.

\* cited by examiner

FIG. 1

FIG. 2 a terminal sends at least one piece of capability indication information to a network, the at least one piece of capability indication information indicating whether the terminal supports measurement for at least one of a first frequency layer or a second frequency layer and reporting of a measurement result     301

METHOD AND DEVICE FOR DETERMINING CAPABILITY OF A TERMINAL, AND COMPUTER-READABLE STORAGE MEDIUM

CROSS-REFERENCE TO RELATED APPLICATION

This application is a U.S. continuation application of International Application No. PCT/CN2019/086451, entitled "TERMINAL CAPABILITY DETERMINATION METHOD AND DEVICE, AND TERMINAL", filed on May 10, 2019, the disclosure of which is hereby incorporated by reference in its entirety.

BACKGROUND

In the project of Carrier Aggregation (CA)-Dual Connectivity (DC) enhancement, a New Radio (NR) frequency layer needs to be measured in Long Term Evolution (LTE) to support requirement of rapidly configuring Evolved UMTS Terrestrial Radio Access (E-UTRA)-NR (EN)-DC; and measurements for an Evolved UMTS Terrestrial Radio Access Network (E-UTRAN) frequency layer and the NR frequency layer need to be performed in NR to support requirements of NR CA and Multi-RAT (MR)-DC.

Based on the above, it is a problem to be clarified about how to indicate a capability of supporting measurement for the NR frequency layer in the LTE and a capability of supporting measurements for the E-UTRAN frequency layer and the NR frequency layer in the NR.

SUMMARY

The embodiments of the disclosure provide a method and device for determining capability of a terminal, and a computer-readable storage medium.

The method for determining capability of a terminal provided by the embodiment of the disclosure includes the following operation.

The terminal sends at least one piece of capability indication information to a network. The at least one piece of capability indication information indicates whether the terminal supports measurement for at least one of a first frequency layer or a second frequency layer and reporting of a measurement result.

The device for determining capability of a terminal provided by the embodiment of the disclosure includes a processor, a memory for storing a computer program executable by the processor, and a transceiver.

The processor is configured to run the computer program to control the transceiver to send at least one piece of capability indication information to a network. The at least one piece of capability indication information indicates whether the terminal supports measurement for at least one of a first frequency layer or a second frequency layer and reporting of a measurement result.

A computer-readable storage medium provided by the embodiment of the disclosure is configured to store a computer program which enables a computer to execute the above method for determining capability of a terminal.

BRIEF DESCRIPTION OF THE DRAWINGS

The drawings described herein are used to provide a further understanding of the disclosure and form a part of the disclosure. The schematic embodiments of the disclosure and descriptions thereof are used to explain the disclosure, and do not form an improper limitation of the disclosure. In the drawings.

DETAILED DESCRIPTION

The technical solutions in the embodiments of the disclosure will be described below in combination with the drawings in the embodiments of the disclosure. It is apparent that the described embodiments are part of the embodiments of the disclosure, but are not all of the embodiments. Based on the embodiments of the disclosure, all other embodiments obtained by those ordinarily skilled in the art without paying any creative work shall fall within the scope of protection of the disclosure.

The technical solutions in the embodiments of the present disclosure may be applied to various communication systems, such as a Global System of Mobile communication (GSM), a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, or a 5G system.

Figure 1:
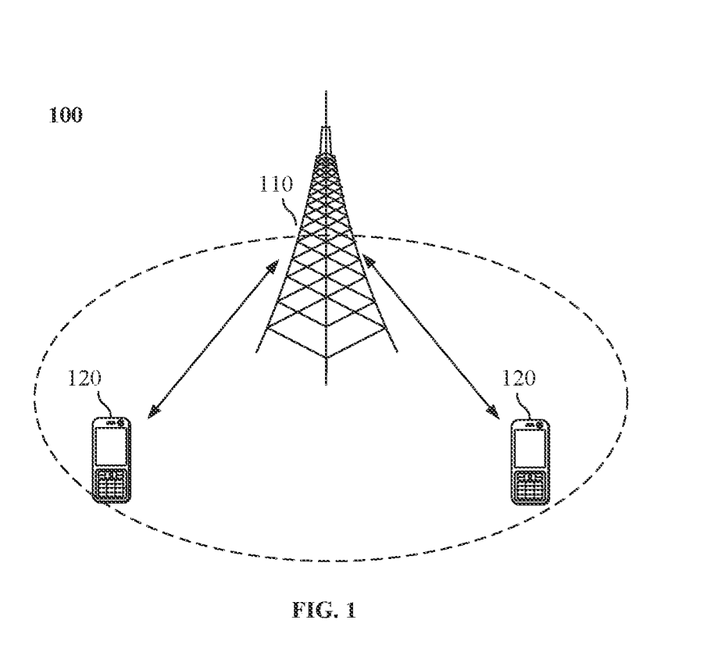
FIG. 1 is a schematic diagram of an architecture of a communication system according to an embodiment of the disclosure.

Exemplarily, a communication system 100 that the embodiments of the present disclosure are applied to is shown in FIG. 1. The communication system 100 may include a network device 110, and the network device 110 may be a device that communicates with a terminal 120 (or called a communication terminal or a terminal device). The network device 110 may provide communication coverage for a particular geographic region and may communicate with a terminal located in the coverage. Optionally, the network device 110 may be a Base Transceiver Station (BTS) in a GSM or the CDMA system, may also be a NodeB (NB) in a WCDMA system, and may further be an Evolutional Node B (eNB or eNodeB) in an LTE system or a wireless controller in a Cloud Radio Access Network (CRAN). The network device may also be a mobile switching center, a relay station, an access point, a vehicle device, a wearable device, a hub, a switch, a network bridge, a router, a network-side device in a future 5G network, a network device in a future evolved Public Land Mobile Network (PLMN) or the like.

The communication system 100 further includes at least one terminal 120 within the coverage of the network device 110. A "terminal device" used herein includes, but not limited to, a device arranged to receive/send a communication signal through a wired line connection, for example, through Public Switched Telephone Networks (PSTN), Digital Subscriber Line (DSL), digital cable and direct cable connections, and/or another data connection/network and/or through a wireless interface, for example, through a cellular networks, a Wireless Local Area Network (WLAN), a digital television networks like a Digital Video Broadcasting-Handheld (DVB-H) networks, a satellite network or an Amplitude Modulated (AM)-Frequency Modulated (FM) broadcast transmitters, and/or via another communication terminal, and/or Internet of Things (IoT) device. The terminal arranged to communicate through a wireless interface may be called a "wireless communication terminal", a "wireless terminal" or a "mobile terminal". Examples of mobile terminals include, but not limited to, a satellite or cellular telephone, a Personal Communications System (PCS) terminal capable of combining a cellular radio telephone and data processing, faxing and data communication capabilities, a Personal Digital Assistant (PDA) capable of including a radio telephone, a pager, Internet/Intranet access, a Web browser, a notebook, a calendar and/or a Global Positioning System (GPS) receiver, and a conventional laptop and/or palmtop receiver or another electronic devices including a radio telephone transceiver. The terminal may refer to an access terminal, User Equipment (UE), a user unit, a user station, a mobile station, a mobile radio station, a remote station, a remote terminal, a mobile device, a user terminal, a terminal, a wireless communication device, a user agent or a user device. The access terminal may be a cellphone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, a vehicle device, a wearable device, a terminal in the 5G network, a terminal in the future evolved PLMN or the like.

Optionally, the terminal 120 may perform Device to Device (D2D) communication with another terminal.

Optionally, the 5G system or the 5G network may also be called a New Radio (NR) system or an NR network.

A network device and two terminals are exemplarily shown in FIG. 1. Optionally, the communication system 100 may include multiple network devices and another number of terminals may be included in the coverage area of each network device. There are no limits made thereto in the embodiments of the present disclosure.

Optionally, the communication system 100 may further include other network entities such as a network controller, a mobility management entity. There are no limits made thereto in the embodiments of the present disclosure.

It is to be understood that a device with a communication function in a network/system in the embodiments of the present disclosure may be called a communication device. For example, for the communication system 100 shown in FIG. 1, the communication device may include the network device 110 and the terminal 120 with the communication function, and the network device 110 and the terminal 120 may be specific devices mentioned above and will not be elaborated herein. The communication device may further include other devices in the communication system 100, for example, other network entities like a network controller and a mobility management entity. There are no limits made thereto in the embodiments of the present disclosure.

It is to be understood that the terms "system" and "network" in the disclosure may usually be used interchangeably. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

In order to facilitate understanding the technical solutions in the embodiments of the disclosure, the technologies related to the embodiments of the disclosure are described below.

Main application scenarios of a 5G mobile communication system

With people's pursuit of speed, latency, high-speed mobility and energy efficiency, and diversity and complexity of services in future life, the 3rd Generation Partnership Project (3GPP) international standards organization has begun to develop 5G. Main application scenarios of 5G are enhanced Mobile Broadband (eMBB), Ultra-Reliable Low-Latency Communications (URLLC), and massive Machine-Type Communications (mMTC). The main application scenarios of the 5G mobile communication system are described below 1) eMBB scenario: a target of the eMBB is to allow a user to obtain multimedia content, service and data, and requirements of services of eMBB are growing very rapidly. Since eMBB may be deployed in different scenarios, such as indoor, urban area, rural area, etc., service capabilities and requirements of eMBB vary greatly. Therefore, the service must be analyzed in combination with specific deployment scenarios.
2) URLLC scenario: typical applications of the URLLC include: industrial automation, power automation, telemedicine operations, traffic safety assurance, etc.
3) mMTC scenario: typical characteristics of the mMTC include: high connection density, small data volume, latency-insensitive service, low-cost module, long service life, etc.

Three Radio Resource Control (RRC) states in 5G network environment

In the 5G network environment, in order to reduce air interface signaling, restore wireless connection quickly and restore data service quickly, a new RRC state, that is, an RRC inactive (RRC_INACTIVE) state is defined. This state is different from an RRC idle (RRC_IDLE) state and an RRC_connected (RRC_CONNECTED) state. The three RRC states in the 5G network environment are described below.

1) RRC_IDLE state: mobility is UE-based cell selection and reselection, paging is initiated by a Core Network (CN), and paging area is configured by the CN. There is no UE Access Stratum (AS) context at a base station. There is no RRC connection.
2) RRC_CONNECTED state: there is an RRC connection, and there is UE AS context at the base station and UE. The network side knows that a location of UE is of a specific cell level. Mobility is the mobility controlled by the network side. Unicast data may be transmitted between UE and the base station.
3) RRC_INACTIVE state: mobility is UE-based cell selection and reselection. There is connection between CN and Radio Access Network (RAN), the UE AS context exists on a certain base station, paging is triggered by RAN, RAN-based paging area is managed by RAN, and the network side knows that the location of UE is based on a paging area level of RAN.

CA Technology

In order to meet high-speed requirements, CA technology is also supported in 5G. CA refers to jointly schedule and use resources on multiple Component Carriers (CCs), so that NR system may support a larger bandwidth and thus may achieve a higher system peak rate. According to a continuity of aggregated carriers on a spectrum, the CA may be divided into continuous carrier aggregation and discontinuous carrier aggregation. According to whether bands in which the aggregated carriers are located are the same, the CA may be divided into Intra-band carrier aggregation and Inter-band carrier aggregation.

Primary Cell Component (PCC) is referred to as primary carrier, there is one and only one PCC, and PCC provides an RRC signaling connection, NAS function, security, etc. Secondary Cell Component (SCC) is referred to as secondary carrier, and SCC only provides additional radio resources.

LTE Release 15 (R15) optimizes the CA, and mainly optimized functions are as follows.

UE measurements during IDLE mode: measurement configuration during the idle mode may be configured in an RRC release message, and the measurement configuration during the idle mode may also be configured by system broadcast SIB5. When there is a dedicated configuration, the dedicated configuration is used, otherwise the measurement configuration in SIB5 is used. There is no effective time limit to idle measurement configuration in SIB5. The idle measurement configuration configured in dedicated signaling also is configured with the effective time configuration, that is, T331. When T331 times out or stops, the idle measurement configuration configured in the dedicated signaling is released. Whether UE continues to use the idle measurement configuration in SIB5 depends on the UE. After obtaining the measurement configuration during the idle mode, the UE performs measurement, indicates a presence of an idle measurement result to the network side in an Uplink (UL) message, and then reports it based on a request mode of the base station. A cell will also broadcast in SIB2 whether reporting of the idle measurement result is supported.

DC Technology

During early deployment of the NR, it is difficult to obtain complete NR coverage, thus the typical network coverage is wide area LTE coverage and NR island coverage mode. Moreover, a large amount of LTE services are deployed below 6 GHz, and there is very little frequency spectrum below 6 GHz to be used by 5G. Thus, NR must study an application of frequency spectrum above 6 GHz, but the high frequency band has limited coverage and fast signal fading. At the same time, in order to protect mobile operators' early investment in LTE, an operating mode of tight interworking between LTE and NR has been proposed.

Figure 2:
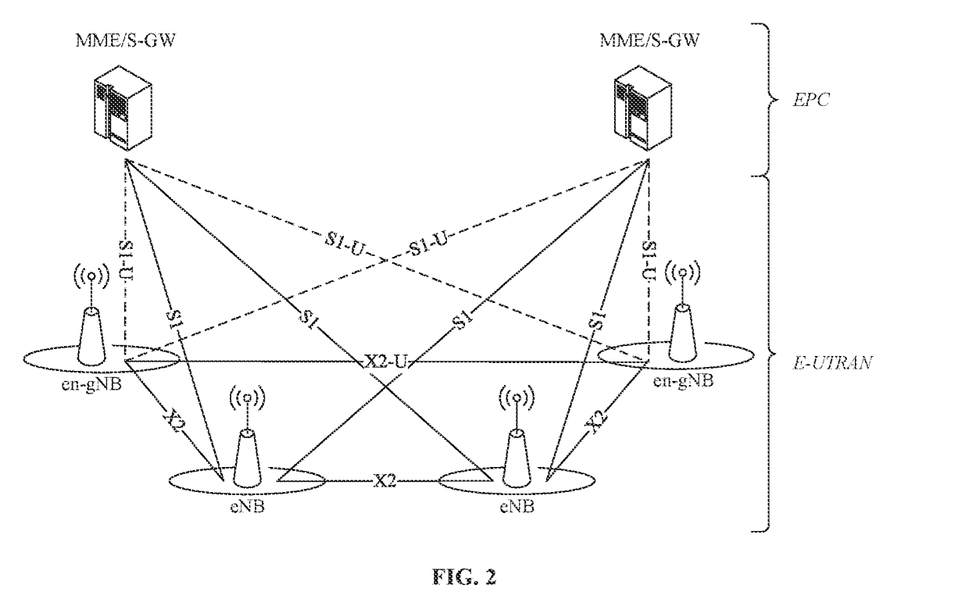
FIG. 2 is a diagram of network deployment and networking architecture of EN-DC according to an embodiment of the disclosure.

In order to achieve 5G network deployment and commercial applications as soon as possible, 3GPP first completed a first 5G version, namely E-UTRA-NR Dual Connectivity (EN-DC). In EN-DC, an LTE base station (eNB) serves as a Master Node (MN), and an NR base station (gNB or en-gNB) serves as a Secondary Node (SN). The network deployment and networking architecture of the EN-DC is shown in FIG. 2. E-UTRAN represents a part of an access network, and EPC represents a part of a core network. The part of the access network consists of at least one eNB (two eNBs are shown in FIG. 2) and at least one en-gNB (two en-gNBs are shown in FIG. 2), herein the eNB serves as a MN, the en-gNB serves as an SN, and both the MN and SN are connected to the EPC.

In the later stage of R15, other DC modes, that is, NR-E-UTRA (NE)-DC, 5G Core Network (5GC)-EN-DC, NR DC, will be supported. For the EN-DC, the core network connected to the access network is EPC, while for the other DC modes, the core network connected to the access network is 5GC.

UE Capability Support

In the project of CA/DC enhancement in Release 16 (R16), corresponding measurement is configured for UE in an idle state or an inactive state, and then the UE reports a measurement result to the network side when entering a connected state, to assist the network side in configuring CA or Multi-RAT (MR)-DC.

In LTE CA, UE measures in an LTE idle mode and reports a measurement result to a network side to assist the network side in configuring function (or capability) of CA. The UE will report UE capability indication information to indicate to the network side whether UE supports the function (or capability). With reference to Table 1, ca-IdleModeMeasurements is the UE capability indication information, and when it is set to be supported, it means that the UE supports the function (or capability).

TABLE 1

| MeasParameters-v1530 ::= | SEQUENCE { | |
|---|---|---|
| qoe-MeasReport-r15 | ENUMERATED {supported} | OPTIONAL, |
| qoe-MTSI-MeasReport-r15 | ENUMERATED {supported} | OPTIONAL, |
| ca-IdleModeMeasurements-r15 | ENUMERATED {supported} | OPTIONAL, |
| ca-IdleModeValidityArea-r15 | ENUMERATED {supported} | OPTIONAL, |
| heightMeas-r15 | ENUMERATED {supported} | OPTIONAL, |
| mutipleCellsMeasExtension-r15 | ENUMERATED {supported} | OPTIONAL |
| } | | |

Moreover, UE may also report UE capability indication information for indicating whether the UE supports EN-DC. With reference to Table 2, en-DC is the UE capability indication information, and when it is set to be supported, it means that the UE supports the function (or capability).

TABLE 2

```
IRAT-ParametersNR-r15 ::=    SEQUENCE {
    en-DC-r15                    ENUMERATED {supported}    OPTIONAL,
    eventB2-r15                  ENUMERATED {supported}    OPTIONAL,
    supportedBandListEN-DC-r15   SupportedBandListNR-r15   OPTIONAL
}
```

Moreover, UE may also report UE capability indication information for indicating whether the UE supports NE-DC. With reference to Table 3, ne-DC is the UE capability indication information, and when it is set to be supported, it means that the UE supports the function (or capability).

TABLE 3

```
EUTRA-Parameters ::=         SEQENCE {
    supportedBandListEUTRA       SEQUENCE (SIZE (1..maxBandsEUTRA)) OF FreqBandindicatorEUTRA,
    eutra-ParametersCommon       EUTRA-ParametersCommon    OPTIONAL,
    eutra-ParametersXDD-Diff       EUTRA-ParametersXDD-Diff   OPTIONAL,
    ... ,
    [[
    ne-DC                    ENUMERATED {supported}        OPTIONAL
    ]]
}
```

In the project of CA-DC enhancement in NR, LTE also needs to extend to support measurement for an NR frequency layer, to support requirement of rapidly configuring EN-DC. On the other hand, an E-UTRAN frequency layer and an NR frequency layer need to be configured in the NR to support requirements of configuring NR CA and MR-DC (NE-DC, NR-DC). In order to clarify the capability of the UE about support or nonsupport for the measurement for an NR frequency layer in the LTE and support or nonsupport for the measurements for the E-UTRAN frequency layer and the NR frequency layer in the NR, the following technical solutions according to the embodiments of the disclosure are proposed.

Figure 3:
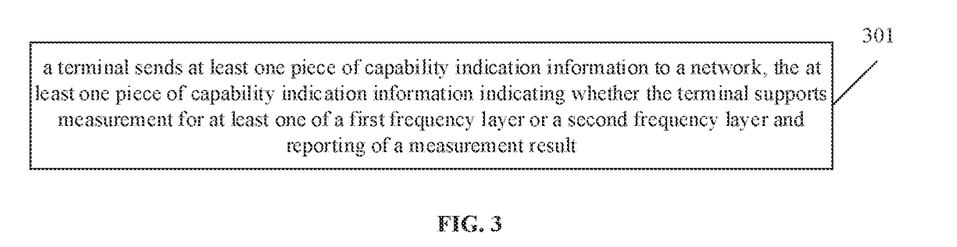
FIG. 3 is a schematic flowchart of a method for determining capability of a terminal according to an embodiment of the disclosure.

FIG. 3 is a schematic flowchart of a method for determining capability of a terminal according to an embodiment of the disclosure. As shown in FIG. 3, the method for determining capability of a terminal includes the following operation.

At block 301, the terminal sends at least one piece of capability indication information to a network. The at least one piece of capability indication information indicates whether the terminal supports measurement for at least one of a first frequency layer or a second frequency layer and reporting of a measurement result.

In the embodiment of the disclosure, the terminal may be any device capable of communicating with the network, such as a mobile phone, a tablet computer, a notebook computer, an in-vehicle terminal and the like.

In the embodiment of the disclosure, the description about the network may also be replaced with a network device. In an example, the network is an access network, and correspondingly, the network device is an access network device (such as a base station).

In an implementation of the disclosure, the first frequency layer is an E-UTRAN frequency layer, and the second frequency layer is an NR frequency layer.

In the embodiment of the disclosure, the terminal sends the at least one piece of capability indication information to the network, and the at least one piece of capability indication information is used for jointly indicating whether the terminal supports the measurement for at least one of the first frequency layer or the second frequency layer and reporting of the measurement result. This is described below in combination with different application scenarios separately.

First Application Scenario

The network is a Long Term Evolution (LTE) access network, and the at least one piece of capability indication information includes first capability indication information, second capability indication information and third capability indication information.

The first capability indication information indicates that the terminal supports a first measurement in an LTE idle state and reporting of a measurement result. The first measurement refers to a measurement performed to assist the network side in configuring Carrier Aggregation (CA).

The second capability indication information indicates that the terminal supports EN-DC.

The third capability indication information indicates that the terminal supports NR.

For example, the terminal reports the first capability indication information, the second capability indication information and the third capability indication information to the LTE access network. The first capability indication information is the ca-IdleModeMeasurements. With reference to the above Table 1, when the ca-IdleModeMeasurements is set to be supported, it means that the terminal supports the corresponding function (or capability). The second capability indication information is the en-DC. With reference to the above Table 2, when the en-DC is set to be supported, it means that the terminal supports the corresponding function (or capability).

Based on the above scenario, the at least one piece of capability indication information indicates that the terminal supports measurement for an NR frequency layer and reporting of a measurement result. This avoids reporting of additional capability indication information from the terminal to the network, and saves signaling overhead.

Further, in an optional implementation of the disclosure, the at least one piece of capability indication information includes, in addition to the above first capability indication information, second capability indication information and third capability indication information, fifth capability indication information for indicating that the terminal supports an inactive state. In this scenario, the at least one piece of capability indication information indicates that the terminal supports performing measurement for at least one of an E-UTRAN frequency layer or an NR frequency layer in the inactive state and reporting of a measurement result.

Second Application Scenario

The network is a Long Term Evolution (LTE) access network, and the at least one piece of capability indication information includes fourth capability indication information for indicating that a version of the terminal is a terminal involved in R16 or later, or indicating that the terminal supports at least one of CA or DC enhancement.

For example, the terminal reports the fourth capability indication information to the LTE access network.

Based on the above scenario, the at least one piece of capability indication information indicates that the terminal supports measurement for an NR frequency layer and reporting of a measurement result.

Further, in an optional implementation of the disclosure, the at least one piece of capability indication information includes, in addition to the above fourth capability indication information, fifth capability indication information for indicating that the terminal supports an inactive state. In this scenario, the at least one piece of capability indication information indicates that the terminal supports performing measurement for at least one of an E-UTRAN frequency layer or an NR frequency layer in the inactive state and reporting of a measurement result.

Third Application Scenario

The network is an NR access network, and the at least one piece of capability indication information includes sixth capability indication information for indicating that the terminal supports early measurement in the NR and reporting of a measurement result.

For example, the terminal reports the sixth capability indication information to the NR access network. The early measurement and reporting of the measurement result means that after performing the measurement according to a measurement configuration, the terminal reports a corresponding measurement result to the network after entering an active state.

In an implementation, the sixth capability indication information is carried in an NR capability container. Specifically, a new capability indication information (that is, the sixth capability indication information) is defined in the NR capability container, and the capability indication information indicates that the terminal supports the early measurement in the NR and reporting of the measurement result.

Based on the above scenario, the at least one piece of capability indication information may have the following two indication modes.

1) The at least one piece of capability indication information indicates that the terminal supports the measurement for the NR frequency layer and reporting of the measurement result.

Further, in an optional implementation of the disclosure, the at least one piece of capability indication information includes, in addition to the above sixth capability indication information, seventh capability indication information for indicating that the terminal supports NE-DC. The seventh capability indication information is the ne-DC. With reference to the above Table 3, when the en-DC is set to be supported, it means that the terminal supports the corresponding function (or capability). In this scenario, the at least one piece of capability indication information indicates that the terminal supports measurement for an E-UTRAN frequency layer and reporting of a measurement result. Further, the at least one piece of capability indication information may further indicate that the terminal supports the measurements for the E-UTRAN frequency layer and the NR frequency layer in the LTE and reporting of the measurement results.

2) The at least one piece of capability indication information indicates that the terminal supports the measurements for the E-UTRAN frequency layer and the NR frequency layer and reporting of the measurement results.

Further, the at least one piece of capability indication information may further indicate that the terminal supports the measurements for the E-UTRAN frequency layer and the NR frequency layer in the LTE and reporting of the measurement results.

Fourth Application Scenario

The network is an NR access network, and the at least one piece of capability indication information includes first capability indication information for indicating that the terminal supports a first measurement in an LTE idle state and reporting of a measurement result. The first measurement refers to a measurement performed to assist a network side in configuring CA.

For example, the terminal reports the first capability indication information to the NR access network. The first capability indication information is the ca-IdleModeMeasurements, and with reference to the above Table 1, when the ca-IdleModeMeasurements is set to be supported, it means that the terminal supports the corresponding function (or capability).

In an implementation, the first capability indication information is carried in an LTE capability container, that is, the terminal sets ca-IdleModeMeasurements to be supported in LTE capability.

In another implementation, the first capability indication information is carried in an NR capability container, that is, the terminal indicates in NR capability that ca-IdleModeMeasurements in the LTE is set to be supported.

Based on the above scenario, the at least one piece of capability indication information indicates that the terminal supports measurements for an E-UTRAN frequency layer and an NR frequency layer in the NR and reporting of measurement results.

Fifth Application Scenario

The network is an LTE access network or an NR access network, and the at least one piece of capability indication information includes eighth capability indication information for indicating whether the terminal supports a second measurement and reporting of a measurement result. The second measurement refers to a measurement performed for DC quick configuration.

For example, the terminal reports the eighth capability indication information to the LTE access network or the NR access network.

In an implementation, the eighth capability indication information is carried in a DC capability container, such as a UE-MRDC-Capability container, which is visible (that is, decodable) for both NR and LTE. The eighth capability indication information indicates whether the terminal supports the measurement performed for MR-DC quick configuration and reporting of the measurement result.

1) When the eighth capability indication information indicates that the terminal supports the second measurement and reporting of the measurement result, the at least one piece of capability indication information indicates that the terminal supports measurements for an E-UTRAN frequency layer and an NR frequency layer and reporting of measurement results.

Herein, whether the terminal resides in the LTE access network or the NR access network, the terminal supports the measurements for the E-UTRAN frequency layer and the NR frequency layer and reporting of the measurement results.

Further, in an optional implementation of the disclosure, the at least one piece of capability indication information includes, in addition to the above eighth capability indication information, ninth capability indication information for indicating that the terminal supports an LTE inactive state. In this scenario, the at least one piece of capability indication information indicates that, when the terminal resides in the LTE access network, the terminal supports measurements for the E-UTRAN frequency layer and the NR frequency layer in the inactive state and reporting of measurement results.

2) When the eighth capability indication information indicates that the terminal does not support the second measurement and reporting of the measurement result, the at least one piece of capability indication information indicates that the terminal does not support the measurements for the E-UTRAN frequency layer and the NR frequency layer and reporting of the measurement results.

Herein, whether the terminal resides in the LTE access network or the NR access network, the terminal does not support the measurements for the E-UTRAN frequency layer and the NR frequency layer and reporting of the measurement results.

3) When the eighth capability indication information indicates that the terminal does not support the second measurement and reporting of the measurement result, the at least one piece of capability indication information further includes tenth capability indication information for indicating whether the terminal supports measurement for an NR frequency layer while residing in the NR access network and reporting of a measurement result.

According to the technical solutions in the embodiments of the disclosure, as to the capability of the terminal about support or nonsupport for the measurement for at least one of the first frequency layer or the second frequency layer and reporting of the measurement result, the method for indicating the capability is defined clearly, that is, whether the terminal supports the measurement for at least one of the first frequency layer or the second frequency layer and reporting of the measurement result are indicated by using at least one piece of capability indication information, which may avoid reporting of additional capability indication information and achieve the purpose of saving signaling.

Figure 4:
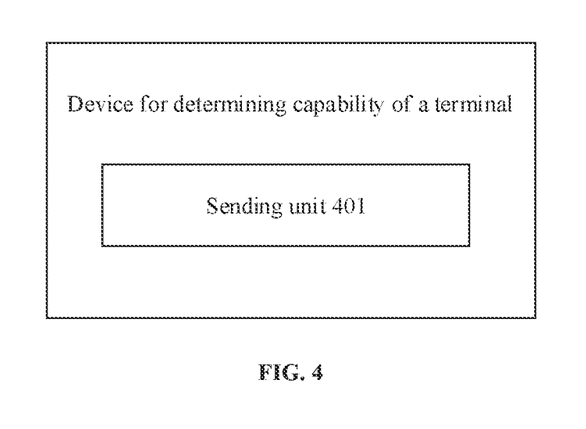
FIG. 4 is a schematic composition diagram of a device for determining capability of a terminal according to an embodiment of the disclosure.

FIG. 4 is a schematic composition diagram of a device for determining capability of a terminal according to an embodiment of the disclosure. As shown in FIG. 4, the device for determining capability of a terminal includes a sending unit 401.

The sending unit 401 is configured to send at least one piece of capability indication information to a network. The at least one piece of capability indication information indicates whether the terminal supports measurement for at least one of a first frequency layer or a second frequency layer and reporting of a measurement result.

In an implementation, the network is an LTE access network, and the at least one piece of capability indication information includes first capability indication information, second capability indication information and third capability indication information.

The first capability indication information indicates that the terminal supports a first measurement in an LTE idle state and reporting of a measurement result. The first measurement refers to a measurement performed to assist a network side in configuring CA.

The second capability indication information indicates that the terminal supports EN-DC.

The third capability indication information indicates that the terminal supports NR.

In an implementation, the network is an LTE access network, and the at least one piece of capability indication information further includes fourth capability indication information.

The fourth capability indication information indicates that a version of the terminal is a terminal involved in R16 or later, or indicates that the terminal supports at least one of CA or DC enhancement.

In an implementation, the at least one piece of capability indication information indicates that the terminal supports measurement for an NR frequency layer and reporting of a measurement result.

In an implementation, the at least one piece of capability indication information further includes fifth capability indication information.

The fifth capability indication information indicates that the terminal supports an inactive state.

In an implementation, the at least one piece of capability indication information indicates that the terminal supports performing measurement for at least one of an E-UTRAN frequency layer or an NR frequency layer in the inactive state and reporting of a measurement result.

In an implementation, the network is an NR access network, and the at least one piece of capability indication information includes sixth capability indication information.

The sixth capability indication information indicates that the terminal supports early measurement in the NR and reporting of a measurement result.

In an implementation, the at least one piece of capability indication information indicates that the terminal supports measurement for an NR frequency layer and reporting of a measurement result.

In an implementation, the at least one piece of capability indication information further includes seventh capability indication information.

The seventh capability indication information indicates that the terminal supports NE-DC.

In an implementation, the at least one piece of capability indication information indicates that the terminal supports measurement for an E-UTRAN frequency layer and reporting of a measurement result.

In an implementation, the at least one piece of capability indication information indicates that the terminal supports measurements for an E-UTRAN frequency layer and an NR frequency layer and reporting of measurement results.

In an implementation, the at least one piece of capability indication information indicates that the terminal supports the measurements for the E-UTRAN frequency layer and the NR frequency layer in the LTE and reporting of the measurement results.

In an implementation, the sixth capability indication information is carried in an NR capability container.

In an implementation, the network is an NR access network, and the at least one piece of capability indication information includes first capability indication information.

The first capability indication information indicates that the terminal supports a first measurement in an LTE idle state and reporting of a measurement result. The first measurement refers to a measurement performed to assist a network side in configuring CA.

In an implementation, the at least one piece of capability indication information indicates that the terminal supports measurements for an E-UTRAN frequency layer and an NR frequency layer in the NR and reporting of measurement results.

In an implementation, the first capability indication information is carried in an LTE capability container or an NR capability container.

In an implementation, the network is an LTE access network or an NR access network, and the at least one piece of capability indication information includes eighth capability indication information.

The eighth capability indication information indicates whether the terminal supports a second measurement and reporting of a measurement result. The second measurement refers to a measurement performed for DC quick configuration.

In an implementation, when the eighth capability indication information indicates that the terminal supports the second measurement and reporting of the measurement result, the at least one piece of capability indication information indicates that the terminal supports measurements for an E-UTRAN frequency layer and an NR frequency layer and reporting of measurement results.

In an implementation, that the terminal supports the measurements for the E-UTRAN frequency layer and the NR frequency layer and reporting of the measurement results includes the following situation.

Whether the terminal resides in the LTE access network or the NR access network, the terminal supports the measurements for the E-UTRAN frequency layer and the NR frequency layer and reporting of the measurement results.

In an implementation, the at least one piece of capability indication information further includes ninth capability indication information for indicating that the terminal supports an LTE inactive state.

The at least one piece of capability indication information indicates that, when the terminal resides in the LTE access network, the terminal supports measurements for the E-UTRAN frequency layer and the NR frequency layer in the inactive state and reporting of measurement results.

In an implementation, when the eighth capability indication information indicates that the terminal does not support the second measurement and reporting of the measurement result, the at least one piece of capability indication information indicates that the terminal does not support the measurements for the E-UTRAN frequency layer and the NR frequency layer and reporting of the measurement results.

In an implementation, that the terminal does not support the measurements for the E-UTRAN frequency layer and the NR frequency layer and reporting of the measurement results includes the following situation.

Whether the terminal resides in the LTE access network or the NR access network, the terminal does not support the measurements for the E-UTRAN frequency layer and the NR frequency layer and reporting of the measurement results.

In an implementation, when the eighth capability indication information indicates that the terminal does not support the second measurement and reporting of the measurement result, the at least one piece of capability indication information further includes tenth capability indication information.

The tenth capability indication information indicates whether the terminal supports measurement for an NR frequency layer while residing in the NR access network and reporting of a measurement result.

In an implementation, the eighth capability indication information is carried in a DC capability container.

Those skilled in the art will appreciate that the relevant description about the device for determining capability of a terminal in the embodiments of the disclosure may be understood with reference to the relevant description about the method for determining capability of a terminal in the embodiments of the disclosure.

Figure 5:
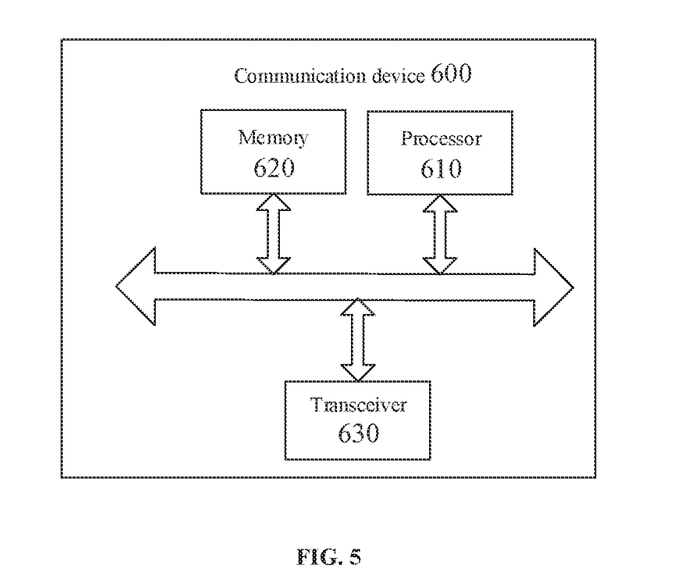
FIG. 5 is a schematic structural diagram of a communication device according to an embodiment of the disclosure.

FIG. 5 is a schematic structure diagram of a communication device 600 according to an embodiment of the disclosure. The communication device may be a terminal, and may also be a network device. The communication device 600 shown in FIG. 5 includes a processor 610, and the processor 610 may call and run a computer program in a memory to implement the methods in the embodiments of the disclosure.

Optionally, as shown in FIG. 5, the communication device 600 may further include the memory 620. The processor 610 may call and run the computer program in the memory 620 to implement the methods in the embodiments of the disclosure.

The memory 620 may be an independent device independent of the processor and may also be integrated into the processor 610.

Optionally, as shown in FIG. 5, the communication device 600 may further include a transceiver 630, and the processor 610 may control the transceiver 630 to communicate with another device. Specifically, the processor 610 may control the transceiver to send information or data to the other device or to receive information or data from the other device.

The transceiver 630 may include a transmitter and a receiver. The transceiver may further include antennae, and the number of the antennae may be one or more.

Optionally, the communication device 600 may specifically be a network device in the embodiment of the disclosure, and the communication device 600 may be configured to implement corresponding flows implemented by the network device in each method in the embodiments of the disclosure. For simplicity, elaborations are omitted herein.

Optionally, the communication device 600 may specifically be the mobile terminal/terminal device in the embodiments of the disclosure, and the communication device may be configured to implement corresponding flows implemented by the mobile terminal/terminal device in each method in the embodiments of the disclosure. For simplicity, elaborations are omitted herein.

Figure 6:
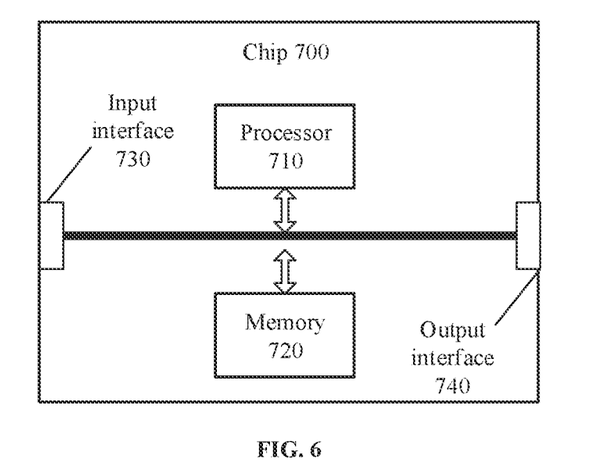
FIG. 6 is a schematic structural diagram of a chip according to an embodiment of the disclosure.

FIG. 6 is a schematic structure diagram of a chip according to an embodiment of the disclosure. The chip 700 shown in FIG. 6 includes a processor 710, and the processor may call and run a computer program in a memory to implement the methods in the embodiments of the disclosure.

Optionally, as shown in FIG. 6, the chip 700 may further include the memory 720. The processor 710 may call and run the computer program in the memory 720 to implement the methods in the embodiments of the disclosure.

The memory 720 may be an independent device independent of the processor 710 and may also be integrated into the processor 710.

Optionally, the chip 700 may further include an input interface 730. The processor 710 may control the input interface 730 to communicate with another device or chip, such as acquiring information or data from the other device or chip.

Optionally, the chip 700 may further include an output interface 740. The processor 710 may control the output interface 740 to communicate with the other device or chip, such as outputting information or data to the other device or chip.

Optionally, the chip may be applied to the network device in the embodiments of the disclosure, and the chip may implement corresponding flows implemented by the network device in each method in the embodiments of the disclosure. For simplicity, elaborations are omitted herein.

Optionally, the chip may be applied to the mobile terminal/terminal device in the embodiment of the disclosure, and the chip may implement corresponding flows implemented by the mobile terminal/terminal device in each method in the embodiment of the disclosure. For simplicity, elaborations are omitted herein.

It is to be understood that the chip mentioned in the embodiment of the disclosure may also be called a system-level chip, a system chip, a chip system or a system on chip, etc.

Figure 7:
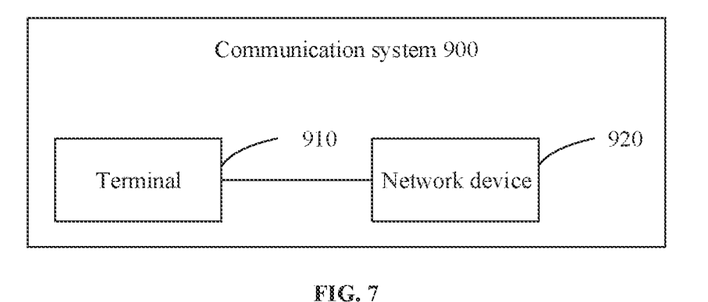
FIG. 7 is a schematic block diagram of a communication system according to an embodiment of the disclosure.

FIG. 7 is a schematic block diagram of a communication system 900 according to an embodiment of the disclosure. As shown in FIG. 7, the communication system 900 includes a terminal device 910 and a network device 920.

The terminal device 910 may be configured to implement corresponding functions implemented by the terminal device in the above methods, and the network device 920 may be configured to implement corresponding functions implemented by the network device in the above methods. For simplicity, elaborations are omitted herein.

It is to be understood that the processor in the embodiment of the disclosure may be an integrated circuit chip and has a signal processing capability. In an implementation process, each step in the method embodiments may be completed by an integrated logical circuit in a hardware form in the processor or an instruction in a software form. The processor may be a general purpose processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The general purpose processor may be a microprocessor or the processor may also be any conventional processor and the like. The steps in the method disclosed in combination with the embodiments of the disclosure may be directly embodied to be executed and completed by a hardware decoding processor or executed and completed by a combination of hardware in the decoding processor and software modules. The software module may be located in a mature storage medium in this field such as a Random Access Memory (RAM), a flash memory, a Read-Only Memory (ROM), a Programmable ROM (PROM) or Electrically Erasable PROM (EEPROM) and a register etc. The storage medium is located in a memory, and the processor reads information in the memory, and completes the steps in the method in combination with the hardware thereof.

It may be understood that the memory in the embodiment of the disclosure may be a volatile memory or a nonvolatile memory, or may include both the volatile and nonvolatile memories. Herein the nonvolatile memory may be a ROM, a PROM, an Erasable PROM (EPROM), an EEPROM or a flash memory. The volatile memory may be an RAM, and is used as an external high-speed cache. In an exemplary but non-limiting embodiment. RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory in a system and method described in the disclosure is intended to include, but not limited to, memories of these and any other proper types.

It is to be understood that the memory is exemplarily but unlimitedly described. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include, but not limited to, memories of these and any other proper types.

The embodiments of the disclosure also provide a computer-readable storage medium, which is configured to store a computer program.

Optionally, the computer-readable storage medium may be applied to a network device in the embodiments of the disclosure, and the computer program enables a computer to execute corresponding flows implemented by the network device in each method in the embodiments of the disclosure. For simplicity, elaborations are omitted herein.

Optionally, the computer-readable storage medium may be applied to a mobile terminal/terminal device in the embodiments of the disclosure, and the computer program enables a computer to execute corresponding flows implemented by the mobile terminal/terminal device in each method in the embodiments of the disclosure. For simplicity, elaborations are omitted herein.

The embodiments of the disclosure also provide a computer program product, which includes a computer program instruction.

Optionally, the computer program product may be applied to a network device in the embodiments of the disclosure, and the computer program instruction enables a computer to execute corresponding flows implemented by the network device in each method in the embodiments of the disclosure. For simplicity, elaborations are omitted herein.

Optionally, the computer program product may be applied to a mobile terminal/terminal device in the embodiments of the disclosure, and the computer program instruction enables the computer to execute corresponding flows implemented by the mobile terminal/terminal device in each method in the embodiments of the disclosure. For simplicity, elaborations are omitted herein.

The embodiments of the disclosure also provide a computer program.

Optionally, the computer program may be applied to a network device in the embodiments of the disclosure, and the computer program, when being executed in a computer, enables the computer to execute corresponding flows implemented by the network device in each method in the embodiments of the disclosure. For simplicity, elaborations are omitted herein.

Optionally, the computer program may be applied to a mobile terminal/terminal device in the embodiments of the disclosure, and the computer program, when being executed in the computer, enables the computer to execute corresponding flows implemented by the mobile terminal/terminal device in each method in the embodiments of the disclosure. For simplicity, elaborations are omitted herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, between the device or the units, and may be electrical, mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions in the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may be stored in a computer-readable storage medium. Based on such an understanding, the technical solutions of the disclosure substantially or parts making contributions to the conventional art or part of the technical solutions may be embodied in form of software product, and the computer software product is stored in a storage medium, including multiple instructions configured to enable a computer device (which may be a personal computer, a server, a network device or the like) to execute all or part of the steps of the method in each embodiment of the disclosure. The above-mentioned storage medium includes: various media capable of storing program codes such as a U disk, a mobile hard disk, a ROM, a RAM, a magnetic disk or an optical disk, etc.

Described above are merely specific embodiments of the disclosure, however, the scope of protection of the disclosure is not limited thereto. Any variations or replacements apparent to those skilled in the art within the technical scope disclosed by the disclosure shall fall within the scope of protection of the disclosure. Therefore, the scope of protection of the disclosure shall be subject to the scope of protection of the claims.

What is claimed is:

1. A method for determining capability of a terminal, comprising:
   sending, by the terminal, at least one piece of capability indication information to a network, the at least one piece of capability indication information indicating whether the terminal supports measurement for at least one of a first frequency layer or a second frequency layer and reporting of a measurement result,
   wherein the at least one piece of capability indication information indicates that the terminal supports measurement for an NR frequency layer and reporting of a measurement result,
   wherein the network is a New Radio (NR) access network, and the at least one piece of capability indication information comprises:
   sixth capability indication information for indicating that the terminal supports early measurement in the NR and reporting of a measurement result.

2. The method of claim 1, wherein the network is a Long Term Evolution (LTE) access network, and the at least one piece of capability indication information comprises:
   first capability indication information for indicating that the terminal supports a first measurement in an LTE idle state and reporting of a measurement result, and the first measurement referring to a measurement performed to assist a network side in configuring Carrier Aggregation (CA);
   second capability indication information for indicating that the terminal supports Evolved UMTS Terrestrial Radio Access (E-UTRA)-New Radio (NR)-Dual Connectivity (EN-DC); and
   third capability indication information for indicating that the terminal supports NR.

3. The method of claim 1, wherein the at least one piece of capability indication information indicates that the terminal supports measurement for an NR frequency layer and reporting of a measurement result.

4. The method of claim 1, wherein the sixth capability indication information is carried in an NR capability container.

5. The method of claim 3, wherein the sixth capability indication information is carried in an NR capability container.

6. A device for determining capability of a terminal, comprising:
   a processor;
   a memory for storing a computer program executable by the processor; and
   a transceiver,
   wherein the processor is configured to run the computer program to:
     control the transceiver to send at least one piece of capability indication information to a network, the at least one piece of capability indication information indicating whether the terminal supports measurement for at least one of a first frequency layer or a second frequency layer and reporting of a measurement result, wherein the at least one piece of capability indication information indicates that the terminal supports measurement for an NR frequency layer and reporting of a measurement result, wherein the network is a New Radio (NR) access network, and the at least one piece of capability indication information comprises:

sixth capability indication information for indicating that the terminal supports early measurement in the NR and reporting of a measurement result.

7. The device of claim 6, wherein the network is a Long Term Evolution (LTE) access network, and the at least one piece of capability indication information comprises:

first capability indication information for indicating that the terminal supports a first measurement in an LTE idle state and reporting of a measurement result, and the first measurement referring to a measurement performed to assist a network side in configuring Carrier Aggregation (CA);

second capability indication information for indicating that the terminal supports Evolved UMTS Terrestrial Radio Access (E-UTRA)-New Radio (NR)-Dual Connectivity (EN-DC); and third capability indication information for indicating that the terminal supports NR.

8. The device of claim 6, wherein the at least one piece of capability indication information indicates that the terminal supports measurement for an NR frequency layer and reporting of a measurement result.

9. The device of claim 6, wherein the sixth capability indication information is carried in an NR capability container.

10. The device of claim 8, wherein the sixth capability indication information is carried in an NR capability container.

11. A non-transitory computer-readable storage medium having stored thereon a computer program which, when being executed by a computer, enables the computer to execute a method for determining capability of a terminal, the method comprising:

sending, by the terminal, at least one piece of capability indication information to a network, the at least one piece of capability indication information indicating whether the terminal supports measurement for at least one of a first frequency layer or a second frequency layer and reporting of a measurement result, wherein the at least one piece of capability indication information indicates that the terminal supports measurement for an NR frequency layer and reporting of a measurement result, wherein the network is a New Radio (NR) access network, and the at least one piece of capability indication information comprises:

sixth capability indication information for indicating that the terminal supports early measurement in the NR and reporting of a measurement result.

12. The non-transitory computer-readable storage medium of claim 11, wherein the network is a Long Term Evolution (LTE) access network, and the at least one piece of capability indication information comprises:

first capability indication information for indicating that the terminal supports a first measurement in an LTE idle state and reporting of a measurement result, and the first measurement referring to a measurement performed to assist a network side in configuring Carrier Aggregation (CA);

second capability indication information for indicating that the terminal supports Evolved UMTS Terrestrial Radio Access (E-UTRA)-New Radio (NR)-Dual Connectivity (EN-DC); and third capability indication information for indicating that the terminal supports NR.

13. The non-transitory computer-readable storage medium of claim 11, wherein the at least one piece of capability indication information indicates that the terminal supports measurement for an NR frequency layer and reporting of a measurement result.

14. The non-transitory computer-readable storage medium of claim 11, wherein the sixth capability indication information is carried in an NR capability container.

* * * * *